United States Patent
Breese et al.

[11] Patent Number: 5,904,622
[45] Date of Patent: May 18, 1999

[54] DRIVESHAFT ASSEMBLY WITH VENTED NOISE REDUCTION STRUCTURE

[75] Inventors: Douglas E. Breese, Northwood; Kellie L. Stevens, Holland, both of Ohio

[73] Assignee: Dana Corporation, Toledo, Ohio

[21] Appl. No.: 08/928,991

[22] Filed: Sep. 12, 1997

[51] Int. Cl.⁶ .................................................... F16C 3/00
[52] U.S. Cl. ........................................ 464/180; 464/903
[58] Field of Search ................................... 464/170, 180, 464/183, 903, 134, 16; 267/141; 188/379

[56] References Cited

U.S. PATENT DOCUMENTS

| | | | |
|---|---|---|---|
| 1,949,500 | 3/1934 | Swenson | 464/134 |
| 2,001,166 | 5/1935 | Swennes | 464/180 |
| 2,023,131 | 12/1935 | Gibson . | |
| 2,028,930 | 1/1936 | Taylor | 188/379 |
| 2,889,695 | 6/1959 | Moeller | 464/180 |
| 3,052,107 | 9/1962 | Kempf | 464/180 |
| 3,075,406 | 1/1963 | Butler, Jr. et al. | 464/180 |
| 3,286,487 | 11/1966 | Esperson | 464/180 |
| 3,479,030 | 11/1969 | Merola . | |
| 3,659,434 | 5/1972 | Wolfe . | |
| 3,819,168 | 6/1974 | Nittinger et al. | 267/141 |
| 3,861,682 | 1/1975 | Fujii . | |
| 4,043,147 | 8/1977 | Wiebe | 464/180 |
| 4,308,729 | 1/1982 | Condon | 464/16 |
| 4,722,717 | 2/1988 | Salzman et al. . | |
| 4,844,193 | 7/1989 | Veselica et al. . | |
| 5,056,763 | 10/1991 | Hamada et al. | 464/180 |
| 5,326,324 | 7/1994 | Hamada | 464/180 |
| 5,331,737 | 7/1994 | Jarvela . | |
| 5,643,093 | 7/1997 | Breese | 464/134 |
| 5,716,276 | 2/1998 | Mangas et al. | 464/134 |

FOREIGN PATENT DOCUMENTS

| | | | |
|---|---|---|---|
| 404153 | 1/1934 | United Kingdom | 464/180 |

OTHER PUBLICATIONS

Dana Drawing No. 2–3–12811X dated Nov. 1994.

*Primary Examiner*—Eileen Dunn Lillis
*Attorney, Agent, or Firm*—MacMillan, Sobanski & Todd, LLC

[57] ABSTRACT

A noise reduction structure for a vehicle driveshaft assembly insures that each of the interior chambers of the driveshaft tube is properly vented during use. The noise reduction structure is a solid member having a predetermined length and a cross sectional shape which corresponds generally to the cross sectional shape of the driveshaft tube. Preferably, the noise reduction structure has an outer diameter which is approximately equal to, or slightly larger than, the inner diameter of the driveshaft tube. As such, the noise reduction structure engages the inner surface of the driveshaft tube in a light press fit relationship. Each noise reduction structure has a passageway, groove, or other opening formed therein which extends axially throughout its length. In a preferred embodiment, an axially-extending groove is formed on the outer circumferential surface of the noise reduction structure. The groove provides for free air flow from one end of the noise reduction structure to the other, thereby insuring that each of the interior chambers of the driveshaft tube is properly vented during use.

7 Claims, 2 Drawing Sheets

DRIVESHAFT ASSEMBLY WITH VENTED NOISE REDUCTION STRUCTURE

BACKGROUND OF THE INVENTION

This invention relates in general to noise reduction structures for use in vehicle driveshaft assemblies. In particular, this invention relates an improved noise reduction structure that has a passageway or other opening formed therethrough for providing a vent between a vent opening formed in an end fitting secured to one end of a driveshaft tube and interior chambers defined within the driveshaft tube when the noise reduction structure is disposed therein.

Torque transmitting shafts are widely used for transferring rotational power between a source of rotational power and a rotatably driven mechanism. An example of a torque transmitting shaft is a driveshaft tube used in a vehicle driveshaft assembly. The driveshaft assembly transmits rotational power from a source, such as an engine, to a driven component, such as a pair of wheels. A typical vehicle driveshaft assembly includes a hollow cylindrical driveshaft tube having an end fitting secured to each end thereof. Usually, the end fittings are embodied as end yokes which are adapted to cooperate with respective universal joints. For example, a driveshaft assembly of this general type is often used to provide a rotatable driving connection between the output shaft of a vehicle transmission and an input shaft of an axle assembly for rotatably driving the vehicle wheels. Traditionally, driveshaft tubes were made from steel. More recently, aluminum driveshafts have been developed because of their lighter weight.

One problem encountered by all types of driveshaft assemblies is their tendency to produce and transmit sound while transferring the power of the engine to the axle assembly. It is known that any mechanical body has a natural resonant frequency. This natural resonant frequency is an inherent characteristic of the mechanical body and is based upon many factors, including its composition, size and shape. The natural resonant frequency is made up of many sub-frequencies, often referred to as harmonics. As the vehicle is operated through its normal speed range (i.e. from 0 mph to about 80 mph), the rotational velocity of the driveshaft assembly changes (i.e. from 0 rpm to about 5000 rpm). As the rotational velocity of the driveshaft changes, it passes through the harmonic frequencies of the body's resonant frequency. When the rotational velocity of the driveshaft passes through these harmonic frequencies, vibration and noise may be amplified since the two frequencies are synchronized and the rotational energy of the driveshaft is converted into vibration and noise. This noise can be undesirable to passengers riding in the vehicle. Thus, it would be advantageous to deaden or reduce the sound produced by a vehicle driveshaft assembly in order to provide the passengers with a more quiet and comfortable ride.

Various attempts have been made to deaden the sound produced by vehicle driveshaft tubes. One general direction that many of these attempts have followed is to place a noise absorbing/deadening structure within the driveshaft. For example, one attempt involves disposing a hollow cylindrical cardboard insert inside an aluminum driveshaft tube to deaden the sound. However, the cardboard insert required external rubber ribs to prevent it from sliding inside the aluminum driveshaft tube. As a result, the cardboard insert is relatively complicated and expensive to employ. It is also known to place a solid noise reduction structure within the driveshaft tube to absorb noise and vibration. A typical noise reduction structure is a generally cylindrical member having a predetermined length which is disposed within a driveshaft tube in a press fit relationship with the inner surface of the driveshaft tube. Typically, the noise reduction structure is positioned within the driveshaft tube at a location where the amplitude of a standing wave caused by the reflection of the sound waves back and forth along the driveshaft tube is at its maximum value. If more than one noise reduction structure is disposed therein, the first noise reduction structure is located a certain distance inward from one of the ends of the driveshaft tube and the remaining noise reduction structures are then spaced apart, typically at equal intervals. As noted previously, the typical driveshaft assembly further includes an end fitting secured to each end of the driveshaft tube.

In any hollow driveshaft assembly, air can become trapped within its internal space when the two end fittings are secured to the hollow driveshaft tube. In the past, this space was vented by forming a vent opening in one of the two end fittings secured to the opposite ends of the driveshaft tube. The vent opening prevents an undesirable vacuum or pressure from occurring within the driveshaft tube. However, the use of one or more solid noise reduction structures within the driveshaft tube prevents some of the internal spaces from being vented through the vent opening. If a noise reduction structure is disposed within the driveshaft tube, the interior of the driveshaft tube is divided into two chambers, one of which is vented and one of which is not. Similarly, if multiple noise reduction structures are disposed therein, the interior of the driveshaft tube is divided into several chambers, with only one of these chambers being vented. While a vent opening could be formed through each of the end fittings, it is preferable to avoid the time and expense involved with such an additional manufacturing step. In addition, this step would not fully vent the interior of the driveshaft tube if two or more noise reduction structures are disposed therein. Thus, it would be desirable to provide an improved noise reduction structure that insures that each of the interior chambers of the driveshaft tube is properly vented during use.

SUMMARY OF THE INVENTION

The invention relates to a noise reduction element or structure for use in a vehicle driveshaft assembly that insures that each of the interior chambers of the driveshaft tube is properly vented during use. The noise reduction structure is a solid member having a predetermined length and a cross sectional shape which corresponds generally to the cross sectional shape of the driveshaft tube. Preferably, the noise reduction structure has an outer diameter which is approximately equal to, or slightly larger than, the inner diameter of the driveshaft tube. As such, the noise reduction structure engages the inner surface of the driveshaft tube in a light press fit relationship. Each noise reduction structure has a passageway, groove, or other opening formed therein which extends axially throughout its length. In a preferred embodiment, an axially-extending groove is formed on the outer circumferential surface of the noise reduction structure. The groove provides for free air flow from one end of the noise reduction structure to the other, thereby insuring that each of the interior chambers of the driveshaft tube is properly vented during use.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
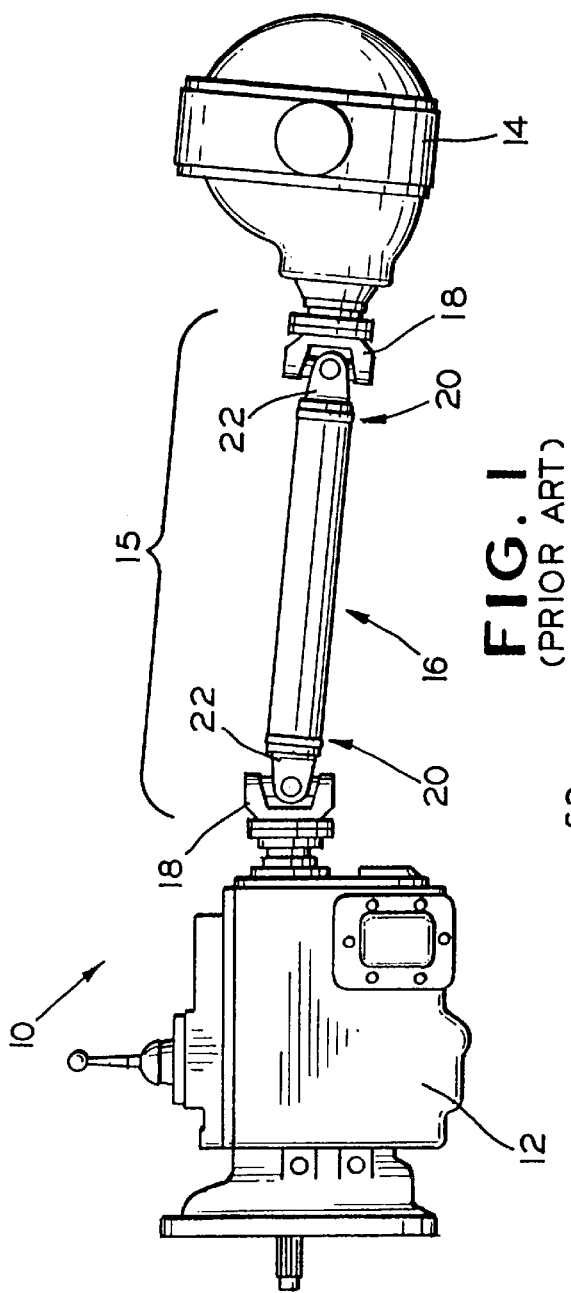
FIG. 1 is a schematic view in elevation of a prior art vehicle drive train including a drive line assembly.

Referring now to the drawings, there is illustrated in FIG. 1 a vehicle drive train, indicated generally at 10, in accordance with this invention. The illustrated vehicle drive train system 10 includes a clutch/transmission assembly 12 that is connected to an axle assembly 14 through a drive line assembly 15. The drive line assembly 15 includes a hollow cylindrical driveshaft tube 16 that is connected between an output shaft (not shown) of the clutch/transmission assembly 12 and an input shaft (not shown) of the axle assembly 14 by a pair of universal joints 18. As is typical in vehicle drive train systems of this type, the output shaft of the clutch/transmission assembly 12 and the input shaft of the axle assembly 14 are not co-axially aligned. The universal joints 18 are provided at each end 20 of the driveshaft tube 16 to rotatably connect the driveshaft tube 16 to the output shaft of the clutch/transmission assembly 12 and the input shaft of the axle assembly 14, while allowing a limited amount of misalignment of the rotational axes thereof. The connection between the ends 20 of the driveshaft tube 16 and the universal joints 22 is usually accomplished by tube yokes 22.

Figure 2:
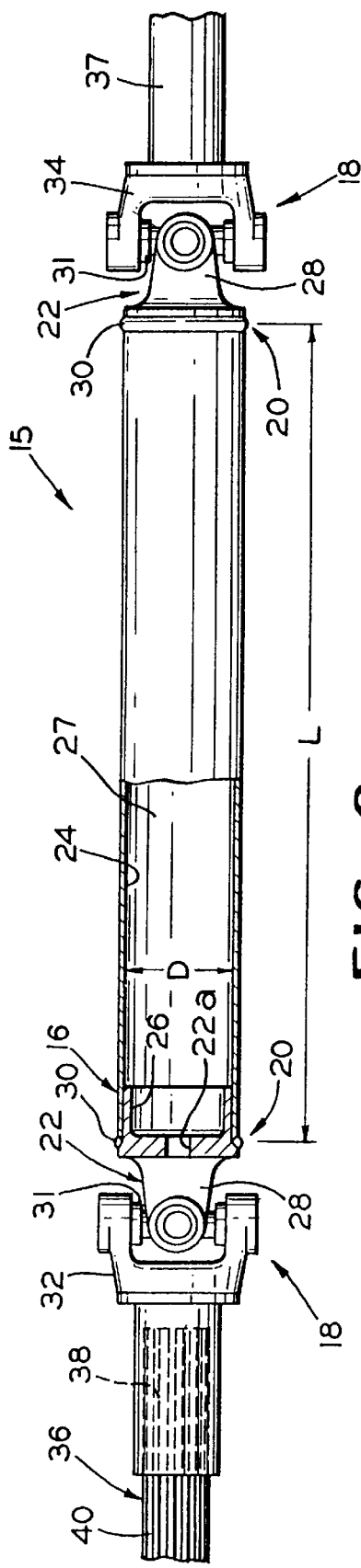
FIG. 2 is a side view, partially in cross section and partially in schematic views, of the prior art drive line assembly illustrated in FIG. 1.

FIG. 2 illustrates the structure of the drive line assembly 15 in detail. As shown therein, the driveshaft tube 16 is an elongated, hollow cylindrical tube having an axial length L defined by the distance between the two ends 20 thereof. The driveshaft tube 16 includes an inner cylindrical surface 24 that extends the length thereof and defines an internal diameter D. The driveshaft tube 16 can be formed from a single piece of metal. Alternatively, multiple piece driveshaft tubes can be used. In addition, the driveshaft 16 can be formed having a larger diameter center portion, an end portion having a reduced diameter, and a diameter reducing portion positioned between the center and end portions. This type of driveshaft tube is more fully described in assignee's commonly owned U.S. Pat. No. 5,643,093, issued Jul. 1, 1997, the disclosure of which is incorporated herein by reference. The driveshaft tube 16 can be formed from any suitable material. Typically, the driveshaft tube 16 is formed from steel or an aluminum alloy. Preferably, the driveshaft tube 16 is formed from an aluminum alloy. Suitable methods for forming the driveshaft tube 16 are well known to persons skilled in the art.

The ends 20 of the driveshaft tube 16 are open and are adapted for receiving an end fitting 22. In the illustrated embodiment, a tube yoke 22 is disposed within each end 20. In general, each tube yoke 22 typically includes a tube seat 26 at one end and a lug structure 28 at the other end. The tube seat 26 is a generally cylindrical-shaped member which is adapted to be inserted into an open end of the driveshaft tube 16. Accordingly, the tube seat 26 enables torque to be transmitted between the driveshaft tube 16 and the tube yoke 22. Typically, the tube yoke 22 is secured to the driveshaft tube 16 by a weld. In the illustrated embodiment, a circle weld 30 is made around the circumference of the interface between the driveshaft tube 16 and the tube yoke 22. Once assembled, the tube yokes 22 and the inner surface 24 of the driveshaft tube 16 define a closed interior chamber 27. In order to prevent the air trapped within the interior chamber 27 from creating an undesirable vacuum or pressurized condition within the driveshaft tube 16, a vent opening 22a is formed in at least one of the tube yokes 22. The vent opening 22a provides fluid communication between the interior chamber 27 and the atmosphere, thereby preventing a vacuum or pressurized condition from occurring within the driveshaft tube 16.

The lug structure 28 of each tube yoke 22 is operatively connected to a cross 31 used in each universal joint 18. Each universal joint 18 also includes a second yoke 32 or 34 as shown in FIG. 2. Each yoke 32 and 34 is operatively connected to a connecting shaft 36 and 37, respectively. One of these connecting shafts 36 may connected to transmission 12, while the other connecting shaft 37 may be connected to the axle assembly 14. In the illustrated embodiment, yoke 32 is a slip yoke having internal splines 38 which cooperate with external splines 40 on the connecting shaft 36 to allow the yoke 32 and the connecting shaft 36 to be axially movable with respect to one another.

Figure 3:
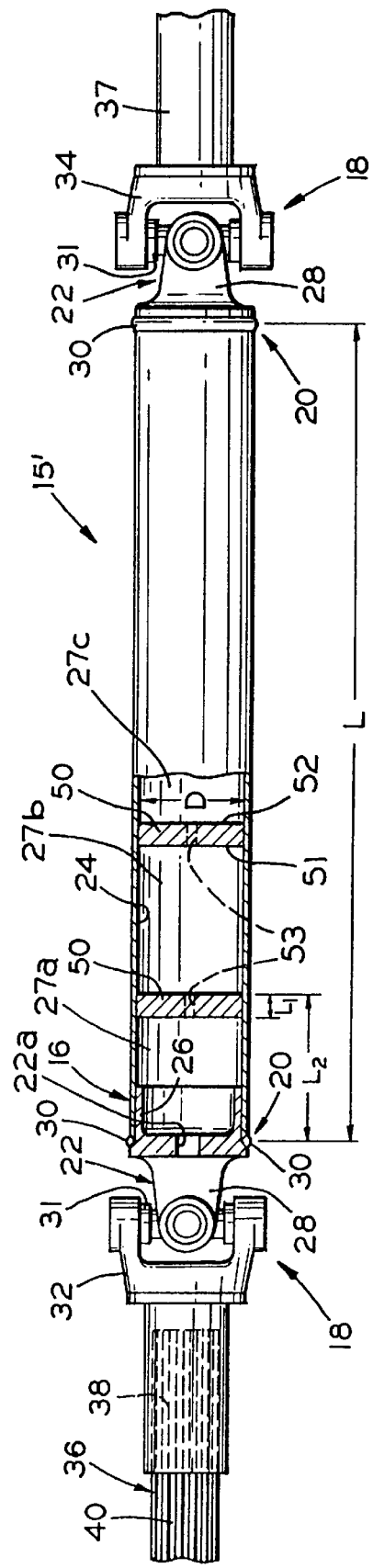
FIG. 3 is a side view, partially in cross section and partially in schematic views, of a drive line assembly having a noise reduction structure disposed within the driveshaft tube in accordance with this invention.

Referring now to FIG. 3, there is illustrated a drive line assembly 15' in accordance with this invention. In general, the drive line assembly 15' includes all of the components described above. Therefore, the description of these components and the numbers used to identify these components are applicable to the description of drive line assembly 15'. However, the drive line assembly 15' in accordance with this invention has improved sound deadening properties to reduce noise and vibration from the driveshaft tube during operation of the vehicle. The invention achieves this benefit by disposing one or more noise reduction element or structures 50 within the driveshaft tube 16. It may be desirable to provide several noise reduction structures 50 at spaced apart locations within the driveshaft tube 16 to address vibration and noise generated by secondary harmonics of the resonant frequency.

It has been found to be desirable to form the noise reduction structures 50 from a polyether material having density of at least 1.4 lb/ft$^3$, and most desirably are formed having a density of 1.5 lb/ft$^3$. In a driveshaft tube 16 having a length of from about 58 inches (1473 mm) to about 70 inches (1778 mm), it has been found desirable to press fit a single elongated noise reduction structure 50 therein that is formed from the polyether material. The noise reduction structure 50 is preferably about 40 inches (1016 mm) in length and is centered within the axial length of such a driveshaft tube 16. Alternatively, a plurality of separate noise reduction structures 50 may be provided within the driveshaft tube 16. It has been found desirable to press fit four of such noise reduction structures 50 formed from the polyether material within the driveshaft tube 16. Each of the noise reduction structures is preferably about 8 inches (203 mm) in length and are spaced equidistantly apart from one another symmetrically within the driveshaft tube 16. However, the size and number of such noise reduction structures 50, as well as the material used therein, may be varied as desired.

Figure 4:
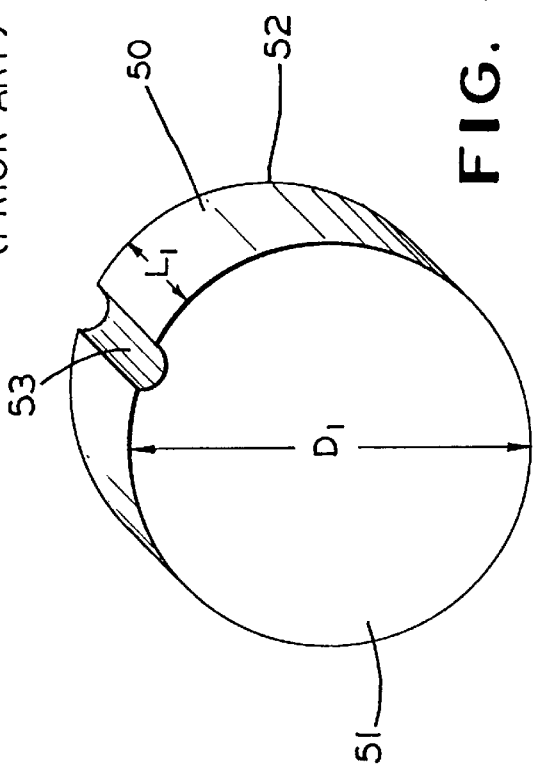
FIG. 4 is a schematic view in perspective of one of the noise reduction structures illustrated in FIG. 3.

One of the noise reducing structures 50 is illustrated in detail in FIG. 4. As shown therein, the noise reduction structure 50 is a generally cylindrical member having an axial length L1 extending from a first end 51 to a second end 52. The noise reduction structure 50 also includes an outer cylindrical surface that defines an outer diameter D1. Preferably, the outer diameter D1 of the noise reduction structure 50 is slightly larger than the inner diameter D of the driveshaft tube 16. When the outer diameter D1 is slightly larger than inner diameter D, the noise reduction structure 50 may be press fit within the driveshaft tube 16. When the noise reduction structure 50 is press fit into the driveshaft tube 16, it may not be necessary to use an adhesive to retain the structure 50 in place. Alternatively, any suitable adhesive may be used to retain the noise reduction structure 50 within the driveshaft tube 16. For example, in a driveshaft tube 16 having an inner diameter D of about 5.0 inches (127 mm), the noise reduction structure 50 may have an outer diameter of about 5.115 inches (129.9 mm) to about 5.135 inches (130.4 mm).

When one or more of the noise reduction structures 50 is disposed within the driveshaft tube 16, as shown in FIG. 3, a plurality of interior sub-chambers (such as shown at 27a, 27b, and 27c in FIG. 3) is defined within the driveshaft tube 16. Each of the noise reductions structures 50 is formed from a material that is substantially impervious to the passage of fluid therethrough. Thus, as shown in FIG. 3, only the first sub-chamber 27a is in direct fluid communication with the vent opening 22a formed through the tube yoke 22. In order to vent the remaining sub-chambers 27b and 27c to the atmosphere, each of the noise reduction structures 50 of this invention has a passageway 53 formed therethrough. In the preferred embodiment of the invention illustrated in FIG. 4, the passageway 53 is a linear, semi-circular groove formed in the outer cylindrical surface of the noise reduction structure 50 that extends between the first and second ends 51 and 52 thereof. However, the passageway 53 need not extend linearly and may be formed having any desired cross sectional shape. Alternatively, the passageway 53 can be formed partially or completely within the noise reduction structure 50, instead of on the outer surface thereof as illustrated. Also, a plurality (not shown) of such passageways 53 may be formed in each of the noise reduction structures 50. The passageways 53 may be linearly aligned within the driveshaft tube 16 as shown in FIG. 4. However, such linear alignment is not necessary. The passageway 53 provides for free air flow from the first end 51 of the noise reduction structure 50 to the second 52 thereof. As a result, each of the interior sub-chambers 27b and 27c of the driveshaft tube 16 is properly vented through the vent hole 22a to the atmosphere. As such, the entire driveshaft assembly 15' is vented, thereby preventing an undesirable pressurized or vacuum condition from occurring therein.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A driveshaft assembly for a vehicle drive train comprising:

a hollow driveshaft tube having a pair of ends and an inner surface;

first and second end fittings secured to said ends of said driveshaft tube so as to define an interior chamber, at least one of said first and second end fittings having a vent opening formed therein; and a noise reduction element press fit within said driveshaft tube to define a pair of interior sub-chambers therein, said noise reduction element being formed from a material that is substantially impervious to the passage of fluid therethrough and having a passageway formed therein to provide fluid communication between said vent opening and each of said interior sub-chambers within said driveshaft tube.

2. The driveshaft assembly defined in claim 1 wherein said noise reduction element includes an outer surface, and wherein said passageway is a groove formed in said outer surface.

3. The driveshaft assembly defined in claim 2 wherein said passageway has a semi-circular cross sectional shape.

4. The driveshaft assembly defined in claim 1 wherein said noise reduction element extends from a first end to a second end, and wherein said passageway extends from said first end to said second end.

5. The driveshaft assembly defined in claim 1 wherein a plurality of noise reduction elements are disposed within said driveshaft tube, each of noise reduction elements having a passageway formed therein.

6. The driveshaft assembly defined in claim 1 wherein said noise reduction element is formed from a polyether material having a density of at least 1.4 lb/ft$^3$.

7. The driveshaft assembly defined in claim 6 wherein said polyether material has a density of 1.5 lb/ft$^3$.

* * * * *